(12) United States Patent
Yakushenko et al.

(10) Patent No.: US 10,557,051 B2
(45) Date of Patent: Feb. 11, 2020

(54) METHOD FOR PRODUCING AN INK, INK, AND USE OF SAME

(71) Applicant: Forschungszentrum Juelich GmbH, Juelich (DE)

(72) Inventors: Alexey Yakushenko, Aachen (DE); Stefanie Hamacher, Niederzier (DE); Dirk Mayer, Frechen (DE); Andreas Offenhaeusser, Aachen (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/076,322

(22) PCT Filed: Feb. 17, 2017

(86) PCT No.: PCT/DE2017/000038
§ 371 (c)(1),
(2) Date: Aug. 8, 2018

(87) PCT Pub. No.: WO2017/152892
PCT Pub. Date: Sep. 14, 2017

(65) Prior Publication Data
US 2019/0040273 A1 Feb. 7, 2019

(30) Foreign Application Priority Data
Mar. 9, 2016 (DE) .......... 10 2016 002 890

(51) Int. Cl.
*H01B 1/20* (2006.01)
*H01B 1/22* (2006.01)
*C09D 11/52* (2014.01)
*C09D 11/033* (2014.01)
*C09D 11/037* (2014.01)
*C09D 11/36* (2014.01)
*C09D 11/32* (2014.01)

(52) U.S. Cl.
CPC ............ *C09D 11/52* (2013.01); *C09D 11/033* (2013.01); *C09D 11/037* (2013.01); *C09D 11/32* (2013.01); *C09D 11/36* (2013.01)

(58) Field of Classification Search
CPC .......... B82Y 10/00; B82Y 40/00; H01B 1/20; H01B 1/22
See application file for complete search history.

(56) References Cited

U.S. PATENT DOCUMENTS

| | | | |
|---|---|---|---|
| 6,604,698 B2 * | 8/2003 | Verhoff | A61K 9/14 241/184 |
| 7,963,646 B2 | 6/2011 | Magdassi et al. | |
| 8,227,022 B2 | 7/2012 | Magdassi et al. | |
| 9,638,693 B2 | 5/2017 | Wolfrum et al. | |
| 2003/0168639 A1 | 9/2003 | Cheon et al. | |
| 2003/0180349 A1 * | 9/2003 | Franklin | A61K 9/0043 424/450 |
| 2006/0254387 A1 | 11/2006 | Lee et al. | |
| 2007/0014405 A1 | 1/2007 | Kikuchi et al. | |
| 2007/0144305 A1 | 6/2007 | Jablonski et al. | |
| 2009/0107359 A1 | 4/2009 | Rogojina et al. | |
| 2010/0009071 A1 | 1/2010 | Chopra et al. | |
| 2012/0232206 A1 | 9/2012 | Wu et al. | |
| 2013/0323179 A1 * | 12/2013 | Popov | A61K 9/5031 424/9.6 |

FOREIGN PATENT DOCUMENTS

| | | |
|---|---|---|
| DE | 102012021222 B4 | 4/2014 |
| EP | 1818123 A1 | 8/2007 |
| EP | 2236565 A1 | 10/2010 |
| WO | WO 0168596 A1 | 9/2001 |
| WO | WO 2009052120 A1 | 4/2009 |

OTHER PUBLICATIONS

Mathias Brust, et al., "Synthesis of Thiol-derivatised Gold Nanoparticles in a Two-phase Liquid-Liquid System", J. Chem. Soc., Chem. Commun., 1994, Dec. 1994, pp. 801-802.

* cited by examiner

Primary Examiner — Haidung D Nguyen
(74) Attorney, Agent, or Firm — Leydig, Voit & Mayer, Ltd.

(57) ABSTRACT

A method for producing an ink includes providing nanoparticles having a size of 0.1 to 20 nm maximum by wet milling using a solvent and covalently bonding, by means of a coupling reaction, short-chain, branched organic stabilizer molecules to the surface of the nanoparticles. The method additionally includes absorbing the stabilized nanoparticles in a solvent for producing the ink and dispersing the stabilized nanoparticles.

19 Claims, No Drawings

METHOD FOR PRODUCING AN INK, INK, AND USE OF SAME

CROSS REFERENCE TO RELATED APPLICATIONS

This application is a U.S. National Stage Application under 35 U.S.C. § 371 of International Application No. PCT/DE2017/000038 filed on Feb. 17, 2017, and claims benefit to German Patent Application No. DE 10 2016 002 890.4 filed on Mar. 9, 2016. The International Application was published in German on Sep. 14, 2017 as WO 2017/152892 A1 under PCT Article 21(2).

FIELD

The invention relates to a method for producing an ink, to an ink, and to the use of an ink.

BACKGROUND

It is known to chemically stabilize nanoparticles, particularly pigments for inks, by means of surface modification to prevent aggregate formation and flocculation of the nanoparticles in the ink. Such stabilization is also used for functional inks based on metallic nanoparticles.

Stabilized nanoparticles can be synthesized for example out of gold chloride ($AuCl_3$) via the Brust-Schiffrin synthesis in a 2-phase system (Brust et al. Synthesis of Thiol-derivatised Gold Nanoparticles in a Two-phase Liquid-Liquid System. J. CHEM. SOC., CHEM. COMMUN., 1994, p. 801). The method provides stabilized gold particles of 1-3 nm in size. Dodecanthiol was used as a stabilizer molecule.

From U.S. Pat. No. 7,963,646 B2, it is known to produce an aqueous ink from Au or Ag nanoparticles. Water-soluble polymers, particularly carboxymethyl cellulose, were proposed as stabilizer molecules.

From U.S. Pat. No. 8,227,022 B2, it is known to produce metal salts in an aqueous dispersion, particularly for an ink. The production method has a pre-reduction step of the metal salts using a water-soluble polymer and subsequently a complete chemical reduction of the particles.

From WO 2001068596 A1, it is known to use stabilized gold nanoparticles for decorative purposes.

From EP 1 818 123 B1, it is also known to use stabilized gold nanoparticles. The particles are further functionalized.

From DE 10 2012 021 222 A1, an ink-jet printing process is known, in which a nano-porous layer is produced by the subsequent sintering of multiple nanoparticle types.

Nanoparticles for inks are generally absorbed in chemically synthesized solvents and additives. These are generally very toxic and thus not compatible with some production processes. For example, these cannot be used for food packaging.

Another disadvantage is the high melting temperature of the nanoparticles or sintering temperature of the inks based on them.

SUMMARY

In an embodiment, the present invention provides a method for producing an ink. The method includes providing nanoparticles having a size of 0.1 to 20 nm maximum by wet milling using a solvent; covalently bonding, by a coupling reaction, short-chain, branched organic stabilizer molecules to the surface of the nanoparticles; and absorbing the stabilized nanoparticles in a solvent for producing the ink and dispersing the stabilized nanoparticles.

DETAILED DESCRIPTION

Embodiments of the invention provide methods for producing an electrically conductive or semiconductive ink, paste, or paint with a preferably low sintering temperature, which differs substantially from material to material, but is preferably less than 200° C.

Embodiments of the invention also provide a corresponding ink with a low sintering temperature, preferably having a sintering temperature less than 200° C., which does not have the disadvantages of prior art. Embodiments of the invention also provide for use of this ink.

According to embodiments of the invention, methods for producing an ink include the following steps:

a) Nanoparticles having a size of 0.1 to 20 nm max., particularly from 0.5 to 5 nm max., are provided; the nanoparticles may be produced either using a "bottom up" or "top down" method;

b) On the surface of the nanoparticles, short-chain, branched organic stabilizer molecules are covalently bonded by means of a coupling reaction. One or multiple types of molecules can be used sequentially or simultaneously as stabilizer molecules. The term "short chain" refers to stabilizer molecules having a skeleton of 2 to 30 carbon atoms;

c) The stabilized nanoparticles are absorbed and dispersed in a solvent for producing the ink.

The provided nanoparticles comprise preferably cores of metals or transition metals, such as Au, Pt, Ag, Pd, Cu, Cr, Ni, Sc, Ti, V, Mn, Fe, Zn, Y, Zr, Nb, Tc, Ru, Mo, Rh, W, Co, Cd, Hf, Ta, Re, Os, Al, Sn, In, Ga, Ir, and others, their oxides and salts, and alloys of two or more aforementioned materials as well as non-alloyed combinations, such as mixtures of two or more of these materials. Pure metals in particular can be used as material for nanoparticles.

It is advantageously proposed to couple the nanoparticles provided in step a) with branched, short-chain, organic molecules to stabilize the nanoparticles (step b)) and to then react them in a conductive or semiconductive ink by means of dispersion in solution (step c)).

In this way, one can avoid inherent disadvantages of the inks and stabilizing nanoparticles from prior art. The advantages of the conductive, semiconductive inks, paints, and pastes according to one or more embodiments of the invention include one or more of the following:

1. Low sintering temperature compared to the high sintering temperatures of commercial gold inks of at least 230° C. (Harima, Japan).
2. High compatibility of the gold ink according to the invention with substrates for printed electronics on polymer films with a working temperature less than 200° C. In contrast to this, gold nanoparticles according to prior art have a melting point >200° C.
3. Low production costs for the nanoparticles, particularly for those produced using the top-down synthesis. Compared to this, in the "bottom up" synthesis according to Brust-Schiffrin the nanoparticles are provided by complicated synthesis with large quantities of solvents and the resulting waste.
4. High level of purity of the nanoparticles according to the invention compared to the relatively low level of purity of nanomaterials as provided in the "bottom up" synthesis according to Brust-Schiffrin due to impure raw material and multiple reaction steps.

5. Environmentally harmful or non-food-compatible solvents and reagents are avoided in the final ink and in the production of nanomaterials.

A method according to an embodiment of the invention can arrange to provide particularly in step a) nanoparticles of metals and transition metals, their oxides or salts and alloys of two or more of the aforementioned materials, and non-alloyed combinations thereof (mixtures).

According to embodiments of the invention, the nanoparticles can be provided by the:

a1) Brust-Schiffrin synthesis and/or a2) Dry or wet grinding with a solvent.

The solvent in step a2) may already comprise the stabilizer molecule and/or additional solvents, which are required for building up the stabilization shell. This has far-reaching benefits. For example, it was recognized within the scope of the invention that for the aforementioned "bottom up" method according to Brust-Schiffrin for producing nanoparticles, unfavorably large quantities of solvents and waste are produced, which result from the chemical reaction of the reactants.

In contrast, in step a2) according to embodiments of the invention, at least one "top down" method is advantageously proposed for producing nanoparticles. To this end, in particular, but not exclusively, metal nanoparticles of pure bulk metals, such as Au, Pt, Ag, Pd, Cu, Cr, Ni, Sc, Ti, V, Mn, Fe, Zn, Y, Zr, Nb, Tc, Ru, Mo, Rh, W, Co, Cd, Hf, Ta, Re, Os, Al, Sn, In, Ga, Ir and others, their oxides and salts, and alloys of two or more previously mentioned materials as well as non-alloyed combinations, such as mixtures, of two or more of these materials can be broken up into ink-suitable nanoparticles and stabilized. The dry and wet grinding process, as well as the other methods mentioned here have the advantage that the resources are milder and more inexpensive than the Brust-Schiffrin synthesis.

To this end, the coupling reaction according to step b) can already be performed during wet grinding according to step a2) by adding a dissolved stabilization molecule, possibly in another solvent. When building up the stabilization shell, this additional solvent is used as a lubricant and/or simultaneously also as a coolant while grinding.

Particularly, wet grinding as a top-down method saves time and costs, and results in purer products. For example, in this manner it is easily possible that stabilized nanoparticles of pure metal are provided in a single step, which comprises simultaneously steps a) and b) of the method.

The nanoparticles, both the small and larger ones, can thus be synthesized using a known "bottom up" method, e.g., using the Brust-Schiffrin synthesis and/or also using a "top down" method. For the "top down" method, one can also use, e.g., the known laser ablation process in the liquid and/or wet or dry grinding procedure.

Multiple stabilized nanoparticles can also be provided in this manner by means of at least one of these methods in particular.

It is advantageously proposed to use a mill, e.g., a ball mill or planetary mill, in which bulk material, e.g., gold, is used and is ground into particles in the nanometer range. The material with hard balls, which consist of zirconium oxide for example, are broken down in such a mill. Through the grinding process in the mill, high speeds and energies are reached, by means of which the hard balls can pulverize the material into nanoparticles.

The milling process can either comprise one step or multiple steps, and as mentioned, be either dry and/or wet. For example, first large gold granulate can be ground into small microparticles by means of dry milling with large spheres (mm-size). Then, the microparticles are ground into nanoparticles using a wet grinding process with smaller spheres (μm-size). Other variants and sequences of the milling processes are also possible.

For stabilizing the formed nanoparticles, the wet milling process uses suitable stabilizer molecules and solvents, which simultaneously serve as lubricants and/or coolants. Additional additives may be used.

As stabilizer molecules, one can either use those described above or also other ones.

After steps a) and/or b) are completed, as an option and particularly advantageously, at least one washing step can take place to clean and separate the stabilized nanoparticles produced in this manner from the milling balls and the non-reacted and/or possibly newly created and possibly undesired ingredients.

In at least one grinding step, it may be necessary to use stable and chemically inert molecules as stabilizer molecules, because less stable molecules can disappear due to chemical changes because of the high energies during the grinding process.

A first stabilization shell according to step b1) can then be replaced in an additional step b2) for a second stabilization shell. To do so, one can use SAM (self-assembled monolayer) principles, e.g., so-called "ligand exchange" reactions. For this to happen, the produced nanoparticles are transferred into a solution, which contains the desired and aforementioned second stabilizer molecules from one or more types of stabilizer molecules. After a certain amount of time, these replace the original stabilizer molecules in the shell.

These "new" stabilizer molecules preferably have a stronger bond, i.e., a higher bonding energy to the nanoparticles than the "old, first" ones, so that the exchange reaction takes place completely. This can be achieved for example by the "new, second" stabilizer molecules bonding covalently to the particles, while the "old, first" stabilizer molecules are not bound covalently.

A milling process has additional advantages compared to chemical synthesis ("bottom up," e.g., Brust-Schiffrin synthesis):

1. The starting material/raw material can then be very pure (e.g., gold 99.999%) compared to usually impure metal salts (e.g., gold chloride $AuCl_3$), from which the nanoparticles are synthesized in "bottom up" syntheses.
2. Pure metals (e.g., gold) are more cost-effective than metal salts, especially those with a high purity level. Nanoparticles according to embodiments of the invention are thus more inexpensive than those of metal salts.
3. During milling, one can produce a large quantity of nanoparticles using small volumes of solvents and large quantities of raw materials. This further reduces the price of nanoparticle production.
4. Smaller quantities of solvents are used, which not only reduces the price but also the quantity of toxic waste.
5. At the same time, the stabilizer molecules can be added to a solvent to build up the stabilization shell.

As referred to above, it is conceivable to execute steps a) and b) and possibly also c) in a single batch and to provide stabilized nanoparticles in this manner, possibly with an additional washing step after step b).

This leads to further cost reductions and environment-friendly nanoparticle production, particularly when such environment-friendly solvents are used in step c).

Selecting a branched organic molecule as stabilizer molecule for step b) is very important for the method. For this, the stabilizer molecule should have a content ranging from $C_2$ to a maximum of $C_{30}$. As stabilizer molecules, one can consider in particular, but not exclusively, 2-methyl-1-butanethiol or also 3-methyl-2-butanethiol.

In this way, an advantageous result is that after printing, the stabilizer molecules sublimate during sintering and transfer into the gas phase.

As stabilizer molecules, one can consider in particular molecules with the following chemical groups: alkyl, aryl, benzyl, alicyclic, heterocyclic, and so on. At least one stabilizer molecule for step b) is used in order to bond it covalently to the surface of the nanoparticles.

A main point in the later suspension of nanoparticles in the ink according to step c) is thus the type of stabilization in the suspension according to step b). This stabilization is achieved by the stabilizer molecule. As stabilizers, one can also use organic molecules, particularly self-assembled monolayers (SAM), polymers, tensides, and other materials.

These molecules are to bond covalently to the nanoparticles. The stabilizer molecules form the shell around the nanoparticle cores. It was recognized that the stabilization shell plays a large role in determining the properties of the small (1-20 nm) nanoparticles, including their solubility in various solvents and the sintering temperature. For that reason, the selection and design of the correct stabilization shell is essential.

At the end of the coupling reaction in step b) and from the stabilizer molecules, a monolayer is arranged as a stabilization shell around the nanoparticles by covalent bonding.

The thickness of the stabilization shell is to correspond to a maximum of 0.1-10 times the radius of the nanoparticles and is limited by the length of the individual stabilizer molecules. When using multiple stabilizer molecules in step b), the thickness of the monolayer also corresponds to the length of the longest stabilizer molecule. The coupling reaction after step b) and the size of the nanoparticles during the method according to steps a) and/or b) can be verified in a correspondingly suitable manner, e.g., by image-generating or light-scattering processes.

The thickness of the stabilization shell is to be 0.1 to 10 times the nanoparticle radius, i.e., approx. 0.1 to 10 nm, and particularly advantageously 0.5 to 5 nm. In any event, the thickness of the monolayered stabilization shell is limited by the length of the individual or longest stabilizer molecule.

The shell is formed either in situ directly during synthesis, e.g., by means of the Brust-Schiffrin method ("bottom up") or it is formed after the nanoparticle production on the surface of already existing nanoparticles.

In a particularly advantageous design, it may be arranged on the nanoparticles during a "top down" method for producing the nanoparticles simultaneously during the crushing in a wet milling process.

As shells or stabilizer molecules, only short-chain molecules, i.e., containing up to 30 carbon atoms ($C_{30}$), are to be used. Branched organic molecules can also be arranged on the nanoparticles during synthesis in situ in the "top down" method or also after synthesis.

In prior art, one generally uses short linear molecules or very long polymers as stabilizers because they form a very dense and gap-free shell around the nanoparticles. However, for the application in conductive and semiconductive inks with low sintering temperatures, the use of branched molecules as stabilizer molecules is more advantageous, particularly when substrates for food technology are involved.

Inks according to embodiments of the invention are therefore suited and usable particularly for the production of outer packaging in the food technology industry.

Within the scope of the invention it was recognized that due to mutual steric interference, branched stabilizer molecules form a relatively permeable shell with many gaps around the small nanoparticles. This advantageously causes the total number of stabilizer molecules to be less per surface area due to steric interference than for linear stabilizer molecules.

This effect is used according to embodiments of the invention to provide inks with low sintering temperatures. These two factors, permeable packing and number of stabilizer molecules per surface unit on the small nanoparticles, are used for the first time to specifically lower the sintering temperature, i.e., the temperature at which the nanoparticles at least partially melt on the printed substrate.

As a result, bridges are advantageously formed between the individual small nanoparticles on the substrates (coalescence, consolidation), which then form a continuous layer.

The short chain length (up to $C_{30}$) advantageously ensures that the sintering temperature remains low, and that the stabilizer molecules sublimate at the sintering temperature of the nanoparticles or below, and transition into the gas phase. This is because in the finished product, particularly in printed circuits, the stabilizer molecules are undesired.

At least one type of stabilizer molecule is to bond covalently to the nanoparticles. Stabilizer molecules R can consist of alkyl, aryl, benzyl, alicyclic, and/or heterocyclic radicals, among others. These may be saturated or unsaturated, i.e., present with carbon double-bonds ($sp^2$-hybridization) or only with carbon mono-bonds ($sp^3$-hybridization).

Branched radicals R are particularly advantageous. The head groups, the so-called alpha position of stabilizer molecule R, can be formed for example out of thiol or amine groups. The end group, the so-called omega position of the stabilizer molecule, can be formed for example of carboxyl, alkyl, ester, thioether, ether, amine, hydroxyamine, amide groups, and so on, to ensure solubility in a large variety of solvents.

It was recognized that the shell of stabilizer molecules has a large influence on the sintering temperature of the nanoparticles, and specifically only when the nanoparticles (without a shell) are especially small, i.e., have a radius particularly of no more than 20 nm, preferably no more than 10 nm, particularly preferred no more than 9, 8, 7, 6, 5, 4, 3, 2, 1 nm.

In regard to larger nanoparticles, the nanoparticle diameter or the intrinsic properties of the material have a larger influence on the sintering temperature. Therefore, the thickness of the stabilization shell shall correspond to 0.1 to 10 times the nanoparticle radius, i.e., be 0.1 to 10 nm thick, and particularly advantageously 0.5 to 5 nm thick. The thickness of the monolayered stabilization shell is thereby limited, as mentioned, by the length of the individual or longest used stabilizer molecule.

To obtain nanoparticles with particularly low sintering temperatures, one can use nanoparticles, which have a maximum radius of 5, 4, 3, 2, 1 nm in particular. At this size, the stabilization shell plays a very large role in the melting temperature or the sintering temperature. By using the aforementioned stabilizer molecules for the stabilization shell, particularly low melting or sintering temperatures can be achieved. Such particles can also be synthesized either in a "bottom up" synthesis and/or be obtained by a "top down" method. At least one of the nanoparticle types used in the finished ink can follow this condition.

Lastly, the stabilized nanoparticles produced according to steps a)-b) are, particularly after a washing step and possibly a filter step and possibly a drying step, absorbed again in a solvent as a basis for the ink according to step c). Therefore, steps a)-b) possibly along with the washing step and/or filter step and/or drying step and particularly steps a)-c) achieve a method for producing an electrically conductive or semiconductive ink, paste, or paint with a preferably low sintering temperature.

For preparing metallic or metal oxide-based inks with stabilization shells as inkjet inks for example, the following steps are necessary:
1. Producing stabilized nanoparticles, particularly by the "top down" and/or "bottom up" methods.
2. Preparing a solvent or a solvent mixture for step c). The liquid phase has a proportion by mass of 30-95% in the ink.
3. After step b), adding nanoparticles having a proportion by mass of 5 to 70% to the solvent or the solvent mixture.
4. Mixing and dispersing the nanoparticles in the solvent to produce the suspension or ink according to step c).

Optionally, the suspension or ink can be filtered before or after step c), e.g., using a filter having a pore width of 0.8 µm for example.

Additional additives can be added to the suspension or ink after step c). Dispersing agents, binders, humectants, adhesion agents, and so on can be added to the ink.

For an inkjet printing ink, the proportion by mass of nanoparticles is preferably set to 5 to 70%, particularly 20, 21, 22, 23, 24, 25, 26, 27, 28, 29, 30, 31, 32, 33, 34, 35, 36, 37, 38, 39 or 40%. Paints and pastes for other printing or deposition methods may have either larger or smaller weight percentages.

It is advantageous if the finished ink has environment-friendly and food-compatible components, such as solvents and additives, preferably not components requiring labelling.

Regarding the formulation of the ink, it is particularly advantageous to use natural, non-toxic solvents for step c) and additives. For example, one can use terpene-based solvents or additives. One can use terpene-based solvents, such as a-terpineol, limonene, carvacrol, linalool, p-cymene, and so on, as well as mixtures thereof, as well as additives based on these, such as adhesion additives from natural resins, e.g., Detrophene made by DRT, France.

The solvents according to step c) and the additives, if applicable, are to be very chemically compatible with the end groups (omega) of the stabilizer molecules, i.e., the omega groups and the solvents are to be easily mixable, so that one can achieve higher nanoparticle concentrations of nanoparticles in the ink. One can use individual solvents and additives as well as combinations of several of them. The solvent or solvent mixture is to also evaporate after printing within 30 minutes maximum at 200° C. so that the printed structures can also be correctly sintered.

Methods according to embodiments of the invention and the selection of small nanoparticles advantageously cause an ink to be provided with nanoparticles having a low sintering temperature, less than 200° C., or less than 160° C. and particularly advantageously less than 120° C. This is particularly suited for use in printed electronics on inexpensive polymer and paper substrates.

An ink according to embodiments of the invention can be printed, e.g., using an inkjet printer, such as a Dimatix DMP 270.

The ink thus preferably has nanoparticles of metals and/or transition metals. It can also consist of their oxides or salts.

The ink may have a combination of two or more materials. Multiple materials such as these may also exist in one single particle type as so-called Janus particles (alloy) or in a heterogeneous mixture of multiple materials.

One can thus use two or more types of nanoparticles with the mentioned properties from different materials, e.g., Au and Ag as well as two or more types of nanoparticles having variable sizes and/or shapes.

For example, one can use two types of nanoparticles. The one type has a radius of 1 nm for example and the others a radius of 20 nm for example, which thus differ at least in the sintering temperature. The ratios in the ink may be different, e.g., 10 to 1, i.e., 10 parts of the smaller nanoparticles, in this case the 1-nm ones, and 1 part of the larger nanoparticles, in this case the 20-nm ones.

In this case, the sintering temperature of the layer will still be very close to the sintering temperature of the smaller gold nanoparticles, in this case the 1-nm ones.

One advantage of such a mixture is that the larger nanoparticles have a greater material weight per particle. In this way, by using the larger nanoparticles, one can achieve the same or a larger weight concentration (wt %) using the same or a smaller particle concentration (mol/L, M). In other words, due to the smaller surface-to-volume ratio of larger nanoparticles, one requires fewer solvent molecules per atom or nanoparticle. Suspensions with lower concentration are normally more stable (longer shelf life) and less sensitive (larger selection of solvents). This effect allows a high load of active materials in the ink.

Particle types A and B may be used particularly from gold and/or platinum nanoparticles or one of the other mentioned materials.

For step c), at least two particle types A and B can be used in the solvent, whose difference in melting points $S_{mA}$ and $S_{mB}$ results from the different chemical composition of the materials of particles A and B. For example, gold and platinum nanoparticles may be used.

For step c), one can use at least two particle types A and B in the solvent (mixture), whose difference in melting points $S_{mA}$ and $S_{mB}$ is due to the different sizes of particles of A and B. For example, two gold nanoparticles of a corresponding size could be used.

For step c), at least two particle types A and B can be used in the solvent (-mixture), whose difference in melting points $S_{mA}$ and $S_{mB}$ is due to the different shape of particles of A and B. For example, gold or platinum nanoparticles could be used, which have a spherical or rod shape.

For step c), at least two particle types A and B can be used in the solvent (-mixture), which are set to an A:B weight ratio of 1:1 to 1,000,000:1 wt/wt to each other in the solvent for the ink. For example, 1 part smaller A and 10 parts of a larger nanoparticle type B could be used.

For step c), at least two particle types A and B can be used or selected in the solvent (-mixture), whose difference in melting points $S_{mA}$ and $S_{mB}$ is at least 1K.

By mixing two types of stabilized nanoparticles, one advantageously achieves a higher proportion by weight in the ink due to larger nanoparticles, while small nanoparticles have a low sintering temperature.

When using inks with larger nanoparticles, after printing and sintering, one obtains more homogeneous, thicker, and more gapless layers with more material than when using smaller nanoparticles, if all other parameters remain the same. However, larger nanoparticles, particularly those larger than 20 nm, are not to be used alone because then the sintering temperature increases substantially.

The production costs of the nanomaterials and inks are advantageously low when using the top down process.

Advantageously, all nanoparticles, both the large and small ones, are produced with the top down method to further reduce costs.

The ink can be arranged and sintered on the substrate using various printing processes, particularly inkjet printing, aerosol jet [printing], screen printing, engraving printing, offset printing, flexography, and so on.

Within the scope of the invention, it was recognized that, according to embodiments of the invention, stabilized nanoparticles have the desired low thermal stability. In particular the nanoparticle stabilized with branched thiols or amines have weak bonding energies to the core of the nanoparticles. This advantageously results in the stabilizer molecules transitioning into the gas phase during sintering of the surface, and the core of the nanoparticles being sintered to the substrate. As stabilizer molecules, one can use one or more types of molecules at the same time. The combination of multiple types of stabilizer molecules enables one to combine the various advantages of the individual molecules, such as their solubility and melting point, with each other. This allows one in a particularly advantageous manner to use the ink to produce printed circuits.

The following materials in particular are used as a substrate: diverse natural and artificial, partially biodegradable polymers, such as polyethylene (PE, HDPE—high-density PE, LDPE—low-density PE), polyethylene terephthalate (PET), polyethylene naphthalate (PEN), polyimide (e.g., Kapton), polyamide, polypropylene, polylactate, and so on, uncoated and coated paper, glass, metal, ceramics, fabric, and so on. The thickness normally ranges from one micrometer up to several hundred micrometers. It may also be a few millimeters or centimeters. The substrates can be completely flat, bent, or curved.

The method advantageously results in the sintering temperature of the produced ink or the melting temperatures of the nanoparticles dispersed in the solution, and the sublimation energy in the stabilization shells being relatively low compared to larger particles with unbranched stabilization shells according to prior art. In prior art, this results in the fact that for materials with higher bulk melting points (e.g., gold or platinum), the sintering temperatures of such nanomaterials in the ink are well over 200° C. Such high temperatures do not allow one to use the ink on inexpensive polymer substrates, since these are normally suited only for temperatures <200° C.

The term "sintering temperature" refers to a temperature to which the printed ink is heated to fuse the individual nanoparticles with each other by melting and thereby form a bonded homogeneous layer. The sintering temperature is to lie at or above the melting temperature of the individual nanoparticles comprising the ink. However, the sintering temperature is also to lie advantageously below or at the glass transition temperature of the substrate so as not to deform it during sintering.

The ink can thus be printed particularly on a substrate and be sintered at a correspondingly low temperature, less than 200° C., possibly also less than 160° C., and particularly advantageously at less than 120° C., depending on the composition of the ink.

Advantageously, a polymer or paper substrate can also be printed on and sintered. Advantageously, temperatures of less than 200° C. can be set.

Structures printed with inks according to embodiments of the invention and sintered at less than 200° C. pertain particularly, but not exclusively, to electronic components as a device. Usage of inks according to embodiments of the invention thus consists in the production of printed electronics on inexpensive polymer or paper substrates having a working temperature of less than 200° C., particularly for outer packaging in the food industry.

If it is conductive, the printed coating is to exhibit good conductivity, i.e., a conductivity that is close to the bulk material (e.g., less by a factor of ten). If semiconductive, the coating printed for the semiconductor with the ink shall exhibit good specific properties, e.g., charge-carrying mobility, i.e., charge-carrying mobility that is as close as possible to the bulk material (e.g., less by a factor of ten).

Example 1

Producing an ink with a mixture of two types of nanoparticles by means of "bottom up"-synthesized gold nanoparticles having a diameter of 2 nm and "top down"-prepared nanoparticles having a diameter of 20 nm without a stabilization shell.

Both particle types are furnished with a stabilization shell of branched 2-methyl-1-butanethiol molecules. The mixture of two types of nanoparticles provides a higher gold weight percentage in the ink due to the larger nanoparticles, while small nanoparticles have a low sintering temperature. The shell of branched thiol molecules advantageously results in a particularly low sintering temperature, especially for the small nanoparticles. Natural, terpene-based solvents are used in step c) for the ink. The ink can be used as a conductive ink for diverse purposes, e.g., as a non-oxidizing conductor path, a temperature sensor, an electrode for electrochemical sensors, and so on.

To prepare this ink, the following steps are executed:
1. Producing two types of nanoparticles:
a. "Bottom up" Brust-Schiffrin synthesis of gold nanoparticles having a diameter of 2 nm: 2.8 equivalents (3.774 g, 6.90 mmol) TOAB (tetraoctylammonium bromide) are dissolved in 200 ml toluene and transferred into a 1 L flask. In a second flask, one dissolves 1 equivalent (1 g, 2.43 mmol) of hydrogen tetrachloroaurate tetrahydrate ($HAuCl_4$ $4H_2O$) in 100 mL of deionized water and then transfers it into the TOAB solution. The solution is stirred vigorously until the aqueous phase becomes transparent and colorless, and the upper toluene phase exhibits the typical reddish color. All the gold has thus transitioned into the organic phase. Then, 3.0 equivalents (0.877 ml, 0.744 g, 7.14 mmol) of 2-methyl-1-butanethiol are added and the solution is stirred for 15 min. During this time, the color of the organic phase first changes to light yellow and then the phase becomes transparent and colorless. Then 10.5 equivalents (0.96 g, 25.38 mmol) of sodium borohydride ($NaBH_4$) are dissolved in 50 mL deionized water and added. The color of the solution changes immediately to brown-wine red. The solution is stirred continuously for 3 hours. Then the solution is transferred to a separating funnel and the water phase is removed. The organic phase is first washed with a 1M table salt solution and then with deionized water. The organic phase is completely removed in the rotation evaporator. To this, one adds 100 mL ethanol. After this addition, the stabilized nanoparticles aggregate and are washed on a ceramic filter three times with ethanol. Then they are dried in a vacuum oven and stored as a powder (steps a) and b)).
b. "Top down" preparation of 20-nm gold nanoparticles in a ball mill:
10 g of gold granulate (1-3 mm diameter) is weighed and placed in a zirconium oxide milling cup. To this, one adds simultaneously 10 mL carvacrol as a solvent for step b) and 20 mL of 2-methyl-1-butanethiol as a stabilizer molecule for step b). As milling balls, one uses 100 g of zirconium oxide balls having a diameter of 300 µm. The mixture is milled at a rotational speed of 1,100 rpm in a ball mill (Pulverisette 7 Premium Line by Fritsch) for 20 hours with multiple breaks. The breaks are necessary so that the steam pressure caused by the milling can be relieved. After the milling, first the produced nanoparticles are separated from the milling balls. To do so, the mixture is washed on a coarse filter (pores should be smaller than the diameter of the milling balls) using a solvent, in which the nanoparticles are easily soluble, e.g., carvacrol. In that step, the nanoparticles go through the filter. Then the nanoparticles are washed over a highly porous (porosity P 1.6 and P 16 according to ISO 4793) ceramic filter with a solvent, in which they are not easily soluble, e.g., ethanol, so that they aggregate and remain on the filter surface. Then, the nanoparticles are dried in a vacuum oven and stored as a powder (steps a) and b)).

A solvent mixture of carvacrol (5 g) and limonene (5 g) is weighed and mixed together to produce the solvent according to step c).

The nanoparticles from 1a (0.5 g) and 1b (2 g) are weighed and mixed, and transferred into the solution for step c).

The dispersion is mixed. To do so, one can use vortex mixers, ultrasonic devices, ball mills, or a similar method with high shear forces.

Lastly, the dispersion is filtered with a 0.8-µm filter to remove possibly undissolved large particles and to avoid blocking the print head nozzle.

This dispersion/ink can then be used, e.g., it can be printed with an inkjet printer (e.g., Dimatix DMP 2700). The sintering temperature after printing is approx. 120° C.

Example 2

Only one ink according to 1b is produced and used. The individual steps are otherwise kept the same.

It is conceivable to also basically achieve the object of the invention by providing stabilized nanoparticles as follows:
a) Nanoparticles having a size of 0.1 to 20 nm maximum, particularly 0.5 to 5 nm maximum, are provided;
b) By means of a coupling reaction, short-chain, branched organic stabilizer molecules are covalently bonded to the surface of the nanoparticles. One or more types of molecules can be used simultaneously as stabilizer molecules. The term "short-chain" refers to stabilization molecules having a skeleton of 2 to 30 carbon atoms;
c) Optional washing step and/or drying of the stabilized nanoparticles.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing an ink, comprising:
a) producing, via a wet milling process using a first solvent, nanoparticles having a size of 0.1 to 20 nm;
b) covalently bonding, by coupling reactions, short-chain, branched organic stabilizer molecules to surfaces of the nanoparticles to form stabilized nanoparticles; and
c) forming the ink by dissolving the stabilized nanoparticles in a second solvent and dispersing the stabilized nanoparticles in the second solvent.

2. The method according to claim 1, wherein the nanoparticles are metal nanoparticles, metal oxide nanoparticles, and/or metal salt nanoparticles.

3. The method according to claim 1, wherein the nanoparticles are pure metal nanoparticles.

4. The method according to claim 1, wherein the wet milling process and the coupling reactions are executed simultaneously by adding a solution including the branched organic stabilizer molecules to a solution formed from the nanoparticles and the first solvent.

5. The method according to claim 1, wherein the branched, organic stabilizer molecules have up to 30 carbon atoms.

6. The method according to claim 1, wherein the short-chain, branched organic stabilizer molecules include multiple stabilizer molecules having a variety of lengths, wherein during the coupling reactions, a mono-layer of stabilizer molecules is formed on the surfaces of the nanoparticles, and wherein a thickness of the mono-layer is limited by a length of a longest of the multiple stabilizer molecules.

7. The method according to claim 1, further comprising washing the stabilized nanoparticles after step b).

8. The method according to claim 1, wherein the second solvent is a terpene.

9. The method according to claim 1, further comprising, before step a), forming small microparticles by grinding large granulate in a dry milling process, wherein producing the nanoparticles comprises grinding the microparticles in the wet milling process.

10. The method according to claim 9, wherein the dry milling process uses mm-size spheres and the wet milling process utilizes µm-size spheres.

11. The method according to claim 10, wherein the wet milling process and the coupling reactions are executed simultaneously by adding a solution including the branched organic stabilizer molecules to the solution formed from the nanoparticles and the first solvent, the method further comprising, during a washing step, cleaning and separating the stabilized nanoparticles from the µm-size spheres utilized in the wet milling process.

12. The method according to claim 9, wherein the covalently bonding, by the coupling reactions, short-chain, branched organic stabilizer molecules to surfaces of the nanoparticles to form stabilized nanoparticles comprises:

adding a solution including the branched organic stabilizer molecules to the solution formed from the nanoparticles and the first solvent to form a first stabilization shell on the nanoparticles.

13. The method according to claim 12, wherein the covalently bonding, by the coupling reactions, short-chain, branched organic stabilizer molecules to surfaces of the nanoparticles to form stabilized nanoparticles further comprises replacing the first stabilization shell by a second stabilization shell.

14. The method according to claim 13, wherein replacing the first stabilization shell by the second stabilization shell comprises transferring the nanoparticles having the first stabilization shell formed thereon to a solution containing the short-chain, branched organic stabilizer molecules.

15. The method according to claim 9, wherein the short-chain, branched organic stabilizer molecules include molecules with one or more of the following chemical groups: alkyl, aryl, benzyl, alicyclic, heterocyclic.

16. The method according to claim 9, wherein the short-chain, branched organic stabilizer molecules include self-assembled monolayers, polymers, and/or tensides.

17. The method according to claim 9, wherein the short-chain, branched organic stabilizer molecules include a head group and an end group.

18. The method according to claim 17, wherein the head group includes a thiol or amine group, and wherein the end group includes a carboxyl, alkyl, ester, thioester, ether, amine, hydroxyamine, or amide group.

19. A method for forming a printed layer, the method comprising:
   a) producing, via a wet milling process using a first solvent, nanoparticles having a size of 0.1 to 20 nm;
   b) covalently bonding, by coupling reactions, short-chain, branched organic stabilizer molecules to surfaces of the nanoparticles to form stabilized nanoparticles;
   c) forming an ink by dissolving the stabilized nanoparticles in a second solvent and dispersing the stabilized nanoparticles in the second solvent; and
   d) forming the printed layer by printing and sintering the ink.

\* \* \* \* \*